(12) United States Patent
Ishimaru

(10) Patent No.: US 8,938,155 B2
(45) Date of Patent: Jan. 20, 2015

(54) COMMUNICATION APPARATUS AND CONTROL METHOD

(75) Inventor: Satoshi Ishimaru, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1476 days.

(21) Appl. No.: 12/496,536

(22) Filed: Jul. 1, 2009

(65) Prior Publication Data

US 2010/0003016 A1    Jan. 7, 2010

(30) Foreign Application Priority Data

Jul. 4, 2008    (JP) ................................. 2008-175917

(51) Int. Cl.
| | |
|---|---|
| H04N 9/80 | (2006.01) |
| H04N 5/44 | (2011.01) |
| H04N 5/232 | (2006.01) |
| H04N 5/77 | (2006.01) |
| H04N 21/436 | (2011.01) |
| H04N 21/4363 | (2011.01) |
| H04N 5/63 | (2006.01) |
| H04N 5/765 | (2006.01) |
| H04N 5/775 | (2006.01) |

(52) U.S. Cl.
CPC ............. *H04N 5/4401* (2013.01); *H04N 5/232* (2013.01); *H04N 5/772* (2013.01); *H04N 21/436* (2013.01); *H04N 21/43635* (2013.01); *H04N 5/63* (2013.01); *H04N 5/765* (2013.01); *H04N 5/775* (2013.01)
USPC ...................................................... 386/248

(58) Field of Classification Search
CPC .... H04N 5/76; G11B 7/0943; G11B 7/08517; G11B 7/08541; G11B 7/094; G11B 7/0941; G11B 20/10; G11B 20/00086; G11B 20/0021; G11B 20/00231; G11B 20/00246; G11B 20/00528; G11B 20/00695; G11B 20/0071; G11B 20/0084; G11B 20/1833; G11B 20/0055; G11B 20/1217; G11B 20/1403; G11B 20/18
USPC .................................. 386/200, 291, 248, 296
See application file for complete search history.

(56) References Cited

U.S. PATENT DOCUMENTS

2004/0101148 A1 *   5/2004   Pyle et al. ...................... 381/101
2006/0067188 A1 *   3/2006   Umehara et al. ............ 369/47.15

(Continued)

FOREIGN PATENT DOCUMENTS

| JP | 63-070317 A | 3/1988 |
|---|---|---|
| JP | 01-093808 A | 4/1989 |

(Continued)

*Primary Examiner* — Tat Chio
(74) *Attorney, Agent, or Firm* — Canon USA, Inc. IP Division

(57) ABSTRACT

A communication apparatus includes a transmitting unit, a receiving unit and a control unit. The transmitting unit transmits a video data to an external apparatus via a first transmission line. The receiving unit receives a command from the external apparatus via a second transmission line. The control unit controls the transmitting unit and the receiving unit in accordance with a command that is received by the receiving unit via the second transmission line. The control unit disables the transmitting unit before a predetermined period of time elapses, if a power off command is received by the receiving unit via the second transmission line, the power off command being used to change the communication apparatus to a power off state, and wherein the control unit disables the receiving unit after the predetermined period of time elapses.

20 Claims, 10 Drawing Sheets

(56) References Cited

U.S. PATENT DOCUMENTS

| | | | |
|---|---|---|---|
| 2006/0206734 A1* | 9/2006 | Hori | 713/300 |
| 2006/0280073 A1* | 12/2006 | Terai | 369/47.11 |
| 2007/0217650 A1* | 9/2007 | Ota et al. | 382/100 |
| 2008/0018786 A1* | 1/2008 | Kageyama et al. | 348/441 |

FOREIGN PATENT DOCUMENTS

| | | |
|---|---|---|
| JP | 08-202475 A | 8/1996 |
| JP | 2003-078779 A | 3/2003 |
| JP | 2007-150805 A | 6/2007 |
| JP | 2010-016701 A | 1/2010 |

* cited by examiner

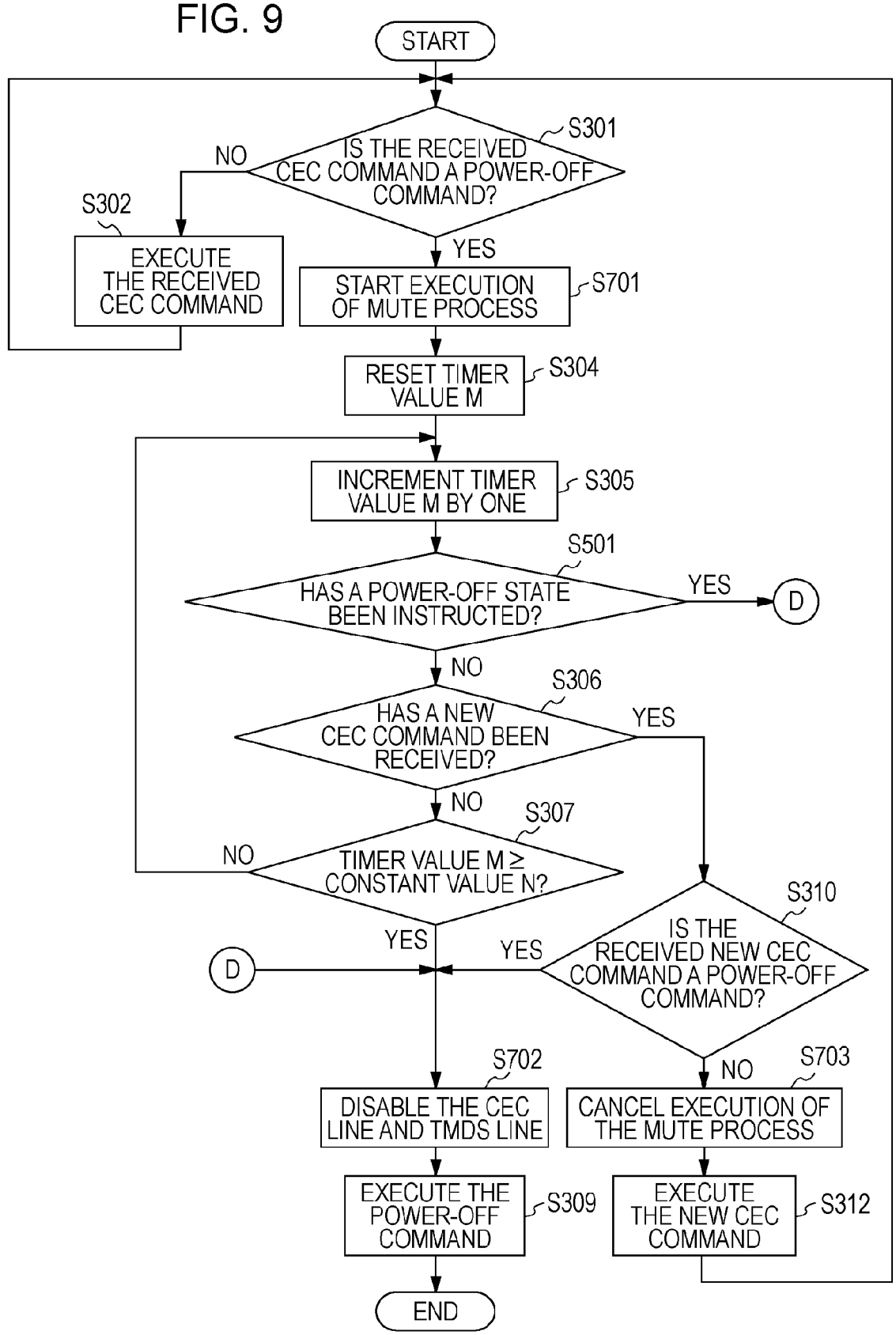

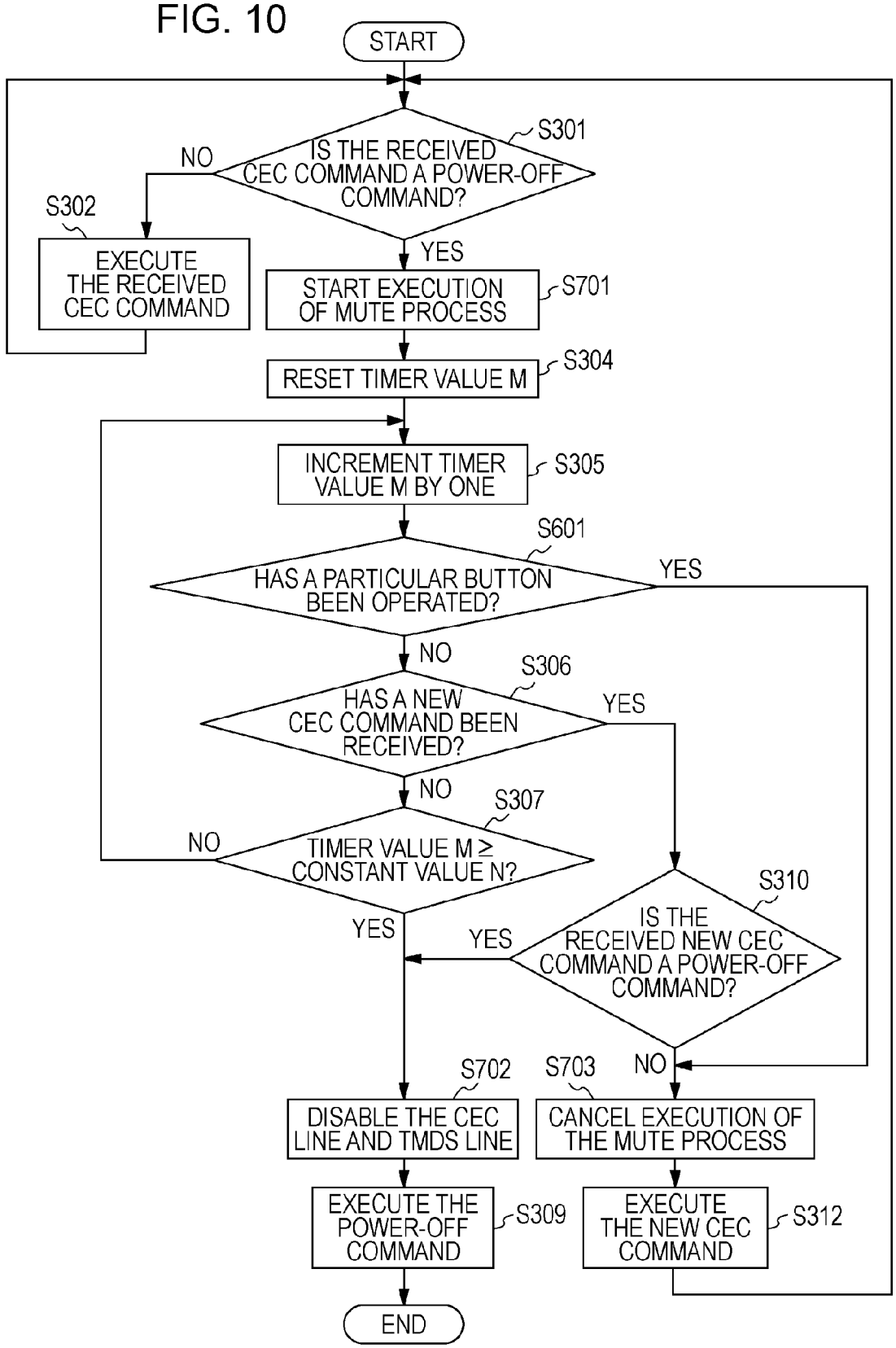

COMMUNICATION APPARATUS AND CONTROL METHOD

BACKGROUND OF THE INVENTION

1. Field of the Invention

The present invention relates to a communication apparatus used for transmits video data to an external apparatus, and a method of the communication apparatus.

2. Description of the Related Art

The communication system disclosed in Japanese Patent Laid-Open No. 2003-78779 is a communication system which connects a communication apparatus and an external display apparatus via a digital interface, and uses the remote control of an external display apparatus to turn on or off the power of the communication apparatus.

However, with an existing communication apparatus, in a case where a control command for powering off the communication apparatus has been transmitted to the communication apparatus from an external display apparatus due to a user's erroneous operation, the user has not been able to cancel the control command thereof any more. In this case, the user has had to turn on the power of the communication apparatus, and also execute the connection process between the communication apparatus and external display apparatus, which is inconvenient.

SUMMARY OF THE INVENTION

According to an aspect of the present invention, there is provided a communication apparatus including: a transmitting unit that transmits video data to an external apparatus via a first transmission line; a receiving unit that receives a command from the external apparatus via a second transmission line; and a control unit that controls the transmitting unit and the receiving unit in accordance with a command that is received by the receiving unit via the second transmission line, wherein the control unit disables the transmitting unit before a predetermined period of time elapses, if a power off command is received by the receiving unit via the second transmission line, the power off command being used to change the communication apparatus to a power off state, and wherein the control unit disables the receiving unit after the predetermined period of time elapses.

According to an aspect of the present invention, there is provided a communication apparatus including: a transmitting unit that transmits video data to an external apparatus via a first transmission line, a receiving unit that receives a command from the external apparatus via a second transmission line; and a control unit that controls the transmitting unit and the receiving unit in accordance with a command that is received by the receiving unit via the second transmission line; wherein the control unit executes a mute process before a predetermined period of time elapses, if a power off command is received by the receiving unit via the second transmission line, the power off command being used to change the communication apparatus to a power off state, and wherein the control unit disables the transmitting unit and the receiving unit after the predetermined period of time elapses.

According to an aspect of the present invention, there is provided a method of controlling a communication apparatus including (a) a transmitting unit that transmits video data to an external apparatus via a first transmission line and (b) a receiving unit that receives a command from the external apparatus via a second transmission line, the method comprising: controlling the transmitting unit and the receiving unit in accordance with a command that is received by the receiving unit via the second transmission line; disabling the transmitting unit before a predetermined period of time elapses, if a power off command is received by the receiving unit via the second transmission line, the power off command being used to change the communication apparatus to a power off state; and disabling the receiving unit after the predetermined period of time elapses.

According to an aspect of the present invention, there is provided a method of controlling a communication apparatus including (a) a transmitting unit that transmits video data to an external apparatus via a first transmission line and (b) a receiving unit that receives a command from the external apparatus via a second transmission line, the method comprising: controlling the transmitting unit and the receiving unit in accordance with a command that is received by the receiving unit via the second transmission line; executing a mute process before a predetermined period of time elapses, if a power off command is received by the receiving unit via the second transmission line, the power off command being used to change the communication apparatus to a power off state; and disabling the transmitting unit and the receiving unit after the predetermined period of time elapses.

Further features and aspects of the present invention will become apparent from the following description of exemplary embodiments with reference to the attached drawings.

BRIEF DESCRIPTION OF THE DRAWINGS

FIG. 9 is a flowchart illustrating an example of process executed at a communication apparatus according to the seventh embodiment of the present invention.

FIG. 10 is a flowchart illustrating an example of process executed at a communication apparatus according to the eighth embodiment of the present invention.

DESCRIPTION OF THE EMBODIMENTS

Various exemplary embodiments, features, and aspects of the present invention will now be described in detail below with reference to the attached drawings.

Figure 1:
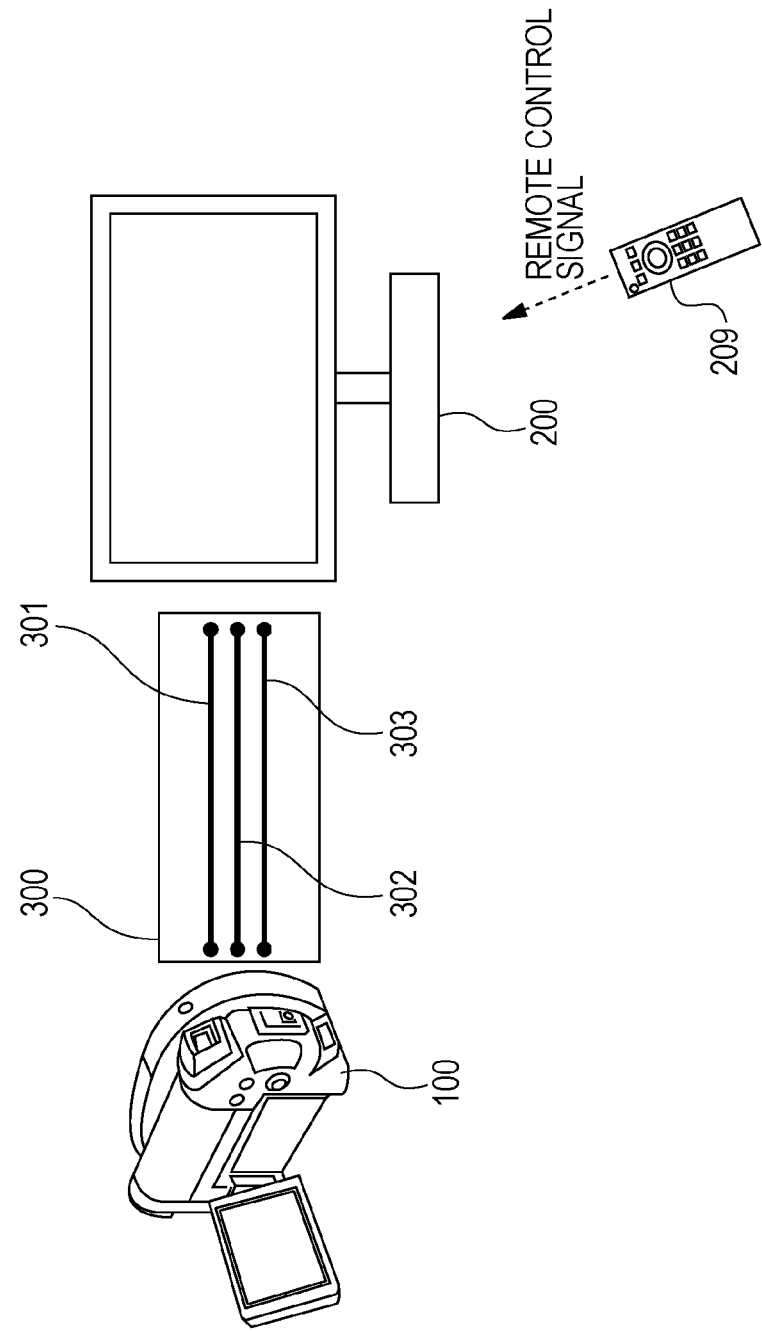
FIG. 1 is a diagram illustrating an example of communication systems according to first through eighth exemplary embodiments of the present invention.
Figure 2:
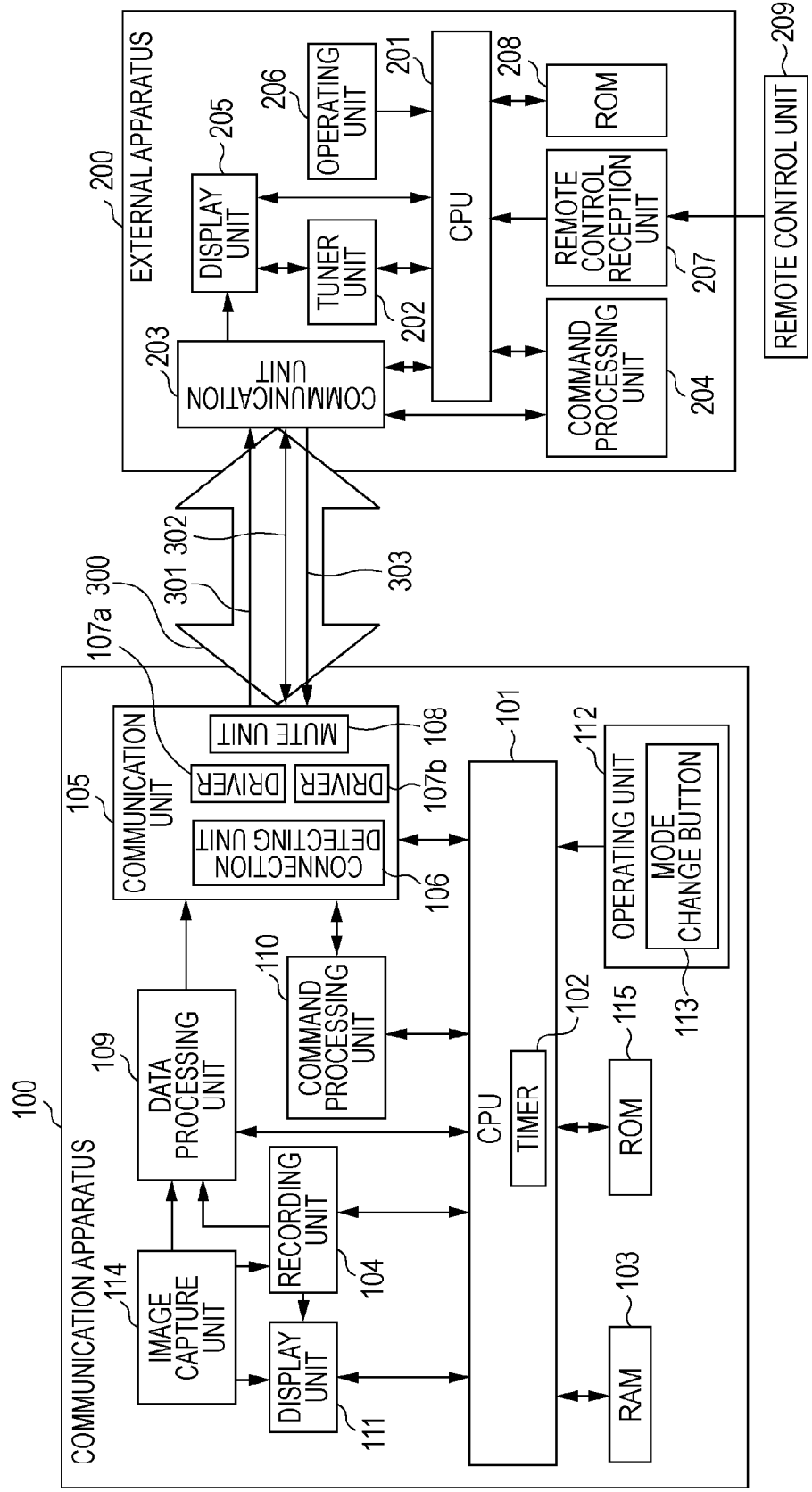
FIG. 2 is a block diagram illustrating an example of the schematic configurations of the communication systems according to the first through eighth exemplary embodiments of the present invention.

FIG. 1 is a diagram illustrating an example of a communication system according to a first embodiment of the present invention. FIG. 2 is a block diagram illustrating an example of the schematic configuration of the communication system according to the first embodiment of the present invention.

The communication system according to the first embodiment includes, as shown in FIGS. 1 and 2, a communication apparatus 100, connection cable 300, external apparatus 200, and remote control unit 209. The communication apparatus 100 and external apparatus 200 are connected via the connection cable 300. The external apparatus 200 and remote control unit 209 are connected wirelessly.

The communication apparatus 100 is a video source that can transmit video data, audio data, and auxiliary data to the external apparatus 200 via the connection cable 300. The external apparatus 200 is an external display apparatus that displays the video data transmitted from the communication apparatus 100 on a display, and outputs the audio data transmitted from the communication apparatus 100 from speakers. The communication apparatus 100 and external apparatus 200 can bidirectionally transmit various control commands via the connection cable 300.

The remote control unit 209 is a user interface used for operating the communication apparatus 100 and external apparatus 200. The remote control unit 209 is configured such that it is capable of communicating with the external apparatus 200 via wireless communication, but incapable of communicating with the communication apparatus 100 wirelessly. The external apparatus 200 receives a remote control signal transmitted from the remote control unit 209, and analyzes the received remote control signal. In a case where the received remote control signal by the external apparatus 200 is a remote control signal for controlling the external apparatus 200, the external apparatus 200 is controlled in accordance with the received remote control signal. In a case where the received remote control signal is a remote control signal for controlling the communication apparatus 100, the external apparatus 200 generates the control command that corresponds to the received remote control signal, and transmits the generated control command to the communication apparatus 100 via the connection cable 300. Thus, the user can directly control the external apparatus 200 using the remote control unit 209. Also, the user can indirectly control the communication apparatus 100 using the remote control unit 209.

With the first embodiment, a video camera is used as an example of the communication apparatus 100, and a television receiving apparatus (hereafter, referred to as "television") is used as an example of the external apparatus 200. Also, with the first embodiment, a connection cable that conforms to the High Definition Multimedia Interface (HDMI) (registered trademark) standard is used as an example of the connection cable 300. Hereafter, the connection cable that conforms to the HDMI standard is hereinafter referred to as "HDMI cable".

Next, the HDMI cable 300 will be described. The HDMI cable 300 includes a Transition Minimized Differential Signaling (TMDS) (registered trademark) line 301, and a Consumer Electronics Control (CEC) line 302. Also, the HDMI cable 300 includes an a Hot Plug Detect (HPD) line 303, a Display Data Channel (DDC) line, and a power supply line.

The TMDS line 301 (first transmission line) is a transmission line for transmitting the video data, the audio data, and the auxiliary data to the television 200 from the video camera 100. The TMDS line 301 includes a TMDS channel 0, TMDS channel 1, TMDS channel 2, and TMDS clock channel. The CEC line 302 (second transmission line) is a transmission line for bidirectionally transmitting various control commands between the video camera 100 and the television 200. The HPD line 303 is a transmission line for transmitting a HPD signal to the video camera 100 from the television 200. The DDC line is a transmission line used for transmitting Extended Display Identification Data (EDID) of the television 200 to the video camera 100 from the television 200. The EDID includes information on capability such as display capability of the television 200. The power supply line is a line that supplies power to the television 200 from the video camera 100.

The video camera 100 operates as an HDMI source defined by the HDMI standard, and the television 200 operates as an HDMI sink defined by the HDMI standard. Also, the video camera 100 and television 200 are both HDMI devices that conform to the CEC standard. The CEC is a control protocol defined by the HDMI standard. Hereafter, a control command to be transmitted between the video camera 100 and television 200 via the CEC line 302 will hereinafter be referred to as a "CEC command". The television 200 can control the video camera 100 by transmitting a CEC command used for controlling the video camera 100 to the video camera 100 via the CEC line 302. The video camera 100 can also control the television 200 by transmitting a CEC command for controlling the television 200 to the television 200 via the CEC line 302. CEC commands used for controlling the video camera 100 is, for example, a power on command, power off command as commands controlling the power of the video camera 100. Further, the CEC command is, for example, a playback command, a stop command, a pause command, a fast forward command, a rewind command, a recording command, a recording pause command, a menu on command, a menu off command, and so forth.

Note that the connection cable 300 is not restricted to a HDMI cable. If a connection cable 300 can be any connection cable other than the HDMI cable separately includes a line that used for transmitting video data, audio data, and auxiliary data, and a line for bidirectionally transmits various control commands between the communication apparatus 100 and the external apparatus 200, the connection cable may be used.

Next, an example of the configuration of the video camera 100 will be described. The video camera 100 includes, as shown in FIG. 2, a central processing unit (CPU) 101, a random access memory (RAM) 103, a recording unit 104, a communication unit 105, a data processing unit 109, a command processing unit 110, a display unit 111, an operating unit 112, an image capture unit 114, and a read only memory (ROM) 115.

The video camera 100 has an operation mode such as image capture mode, a playback mode, or the like. In a case where the operation mode of the video camera 100 is the image capture mode, the video camera 100 can capture an image of an object, and can record an imaged video (any one of a moving image and still image) in a recording medium. In a case where the operation mode of the video camera 100 is the playback mode, the video camera 100 can reproduced the video (any one of a moving image and still image) selected by the user from the recording medium.

The CPU 101 controls the operation of the video camera 100 in accordance with a computer program stored in the ROM 115. Also, the CPU 101 includes a timer 102 for counting a value N. Let us say that the value N is, for example, a value equivalent to three through ten seconds.

The RAM 103 is a memory that functions as a work area of the CPU 101, and is the memory used for storing various values, data, and information used by the CPU 101. The CPU 101 acquires information relating to the television 200 from the television 200 via the HDMI cable 300, and stores the acquired information in the RAM 103. The information stored in the RAM 103 is, for example, a globally unique identifier (GUID), which is a unique identifier of the television 200, and the EDID of the television 200. Note that the work area of the CPU 101 is not limited to the RAM 103, and an external storage unit such as a hard disk apparatus can also be used.

In a case where the operation mode of the video camera 100 is the image capture mode, the image capture unit 114 senses an object and generates video data from an optical video of the object thereof. The video data generated by the image capture unit 114 is supplied to the recording unit 104, display unit 111, and data processing unit 109. Audio data generated by a microphone unit (not shown) will also be supplied to the recording unit 104 and the data processing unit 109.

In a case where the operation mode of the video camera 100 is the image capture mode, the recording unit 104 can record the video data generated by the image capture unit 114 and the audio data generated by the microphone unit in the recording medium.

Also, in a case where the operation mode of the video camera 100 is the playback mode, the recording unit 104 can reproduce the video data and audio data selected by the user from the recording medium. The video data reproduced from the recording medium is supplied to the display unit 111 and the data processing unit 109. On the other hand, the audio data reproduced from the recording medium is supplied to the data processing unit 109 and a speaker unit (not shown). The recording medium used by the recording unit 104 can be either a recording medium integrated in the video camera 100, or a recording medium removable from the video camera 100.

The communication unit 105 includes an HDMI terminal used for connecting the HDMI cable 300. In a case where the video camera 100 is the image capture mode, the communication unit 105 transmits the video data generated by the image capture unit 114, the audio data generated by the microphone unit (not shown), and the auxiliary data generated by the CPU 101 to the television 200 via the TMDS line 301. In a case where the operation mode of the video camera 100 is the playback mode, the communication unit 105 transmits the video data and audio data that the recording unit 104 reproduced from the recording medium, and the auxiliary data generated by the CPU 101 to the television 200 via the TMDS line 301.

Also, the communication unit 105 includes a connection detecting unit 106, TMDS driver 107a, CEC driver 107b, and mute unit 108.

The connection detecting unit 106 uses for the HPD signal transmitted to the video camera 100 from the television 200 to detect connection between the video camera 100 and television 200 (hereafter, HDMI connection). The connection detecting unit 106 receives the HPD signal from the television 200 via the HPD line 303. In a case where the HPD signal is high, the connection detecting unit 106 detects HDMI connection between the video camera 100 and television 200. In a case where the HPD signal is low, the connection detecting unit 106 detects disconnection of the HDMI connection between the video camera 100 and television 200. In a case where the HPD signal fails to be detected, the connection detecting unit 106 also detects disconnection of the HDMI connection between the video camera 100 and television 200. The connection detection 106 informs the detection result to the CPU 101. Accordingly, the CPU 101 can determine whether or not the HDMI connection between the video camera 100 and television 200 has been disconnected by the detection result.

The TMDS driver 107a is a controller used for controlling the TMDS line 301. In the case of receiving a TMDS enable signal from the CPU 101, the TMDS driver 107a changes to a normal state from a low consumption power state. In this case, the TMDS driver 107a enables the TMDS line 301. In a case where the TMDS line 301 has been enabled, the communication unit 105 can transmit the video data, the audio data, and the auxiliary data to the television 200 via the TMDS line 301.

In the case of receiving a TMDS disable signal from the CPU 101, the TMDS driver 107a changes to a low consumption power state from a normal state. In this case, the TMDS driver 107a disables the TMDS line 301. In a case where the TMDS line 301 has been disabled, the communication unit 105 fails to transmit the video data, the audio data, and the auxiliary data to the television 200 via the TMDS line 301, but the consumption power of the communication unit 105 is reduced.

The CEC driver 107b is a controller used for controlling the CEC line 302. In the case of receiving a CEC enable signal from the CPU 101, the CEC driver 107b changes to a normal state from a low consumption power state. In this case, the CEC driver 107b enables the CEC line 302. In a case where the CEC line 302 has been enabled, the communication unit 105 can receive a CEC command used for controlling the video camera 100 from the television 200, and can also transmit a CEC command used for controlling the television 200 to the television 200.

In the case of receiving a CEC disable signal from the CPU 101, the CEC driver 107b changes to a low consumption power state from a normal state. In this case, the CEC driver 107b disables the CEC line 302. In a case where the CEC line 302 has been disabled, the communication unit 105 fails to receive a CEC command used for controlling the video camera 100 from the television 200, and also fails to transmit a CEC command used for controlling the television 200 to the television 200.

The mute unit 108 generates data used for changing the television 200 to in a mute state (hereafter, referred to as mute instruction), and executes mute process for transmitting the generated mute instruction to the television 200 via the TMDS line 301. The mute instruction is one of the auxiliary data sent via the TMDS line 301. In a case where execution of the mute process is started, the CPU 101 controls the mute unit 108 to transmit the mute instruction to the television 200 continuously until execution of the mute process is canceled. In this case, the CPU 101 controls the data processing unit 109 and communication unit 105 to transmit the mute image and silent data stored in the ROM 115 to the television 200 continuously until execution of the mute process is canceled. Note that the mute image and silent data stored in the ROM 115 are transmitted to the television 200 via the TMDS line 301.

Also, the communication unit 105 can receive the CEC command from the television 200 via the CEC line 302. In the case of receiving the CEC command from the television 200, the communication unit 105 supplies the received CEC command to the CPU 101 via the command processing unit 110.

Also, the communication unit 105 can also transmit a CEC command for controlling the television 200 to the television 200 via the CEC line 302. A CEC command for controlling the television 200 is generated at the CPU 101, and is supplied to the communication unit 105 via the command processing unit 110.

In a case where the operation mode of the video camera 100 is the image capture mode, the data processing unit 109 supplies the video data generated at the image capture unit 114, the audio data generated by the microphone unit (not shown), and the auxiliary data supplied from the CPU 101 to the communication unit 105. In a case where the operation mode of the video camera 100 is the playback mode, the data processing unit 109 supplies the video data and the audio data that the recording unit 104 reproduced from the recording medium, and the auxiliary data supplied from the CPU 101 to the communication unit 105.

The display unit 111 includes a liquid crystal display. In a case where the operation mode of the video camera 100 is the image capture mode, the display unit 111 displays the video data generated by the image capture unit 114. In a case where the operation mode of the video camera 100 is the playback mode, the display unit 111 displays the video data reproduced by the recording unit 104 from the recording medium.

Further, if the video camera 100 is in the mute state, the display unit 111 displays the mute image stored in the ROM 115. According to first embodiment, the mute image is video data that indicates that the mute process is being executed. The mute image is, for example, a black back video (a video of which the background color is black) or blue back video (a video of which the background color is blue). An icon and character information indicating that the mute process is being executed may be included in the mute image. Note that, with the first embodiment, an arrangement has been made wherein, in a case where the display unit 111 is in a mute state, the mute image stored in the ROM 115 is displayed on the display unit 111, but the display on the display unit 111 is not restricted to this. In a case where the display unit 111 is in a mute state, nothing may be displayed on the display unit 111.

The operating unit 112 is a user interface used for operating the video camera 100, and includes a plurality of buttons used for operating the video camera 100. The instruction given by the user is sent to the CPU 101 via the operating unit 112. Each button included the operating unit 112 is configured by a switch, or touch panel. The operating unit 112 includes a power button, start/stop button, mode change button 113, menu button, + button, − button, SET button, and so forth.

The power button is a button used for instructing the CPU 101 to change the state of the video camera 100 to a power on state or a power off state. The power on state is a state in which power can be supplied to the whole of the video camera 100 from a power source (not shown) such as a battery, or an AC power source. The power off state is a state in which supply of power to a part of the video camera 100 or the whole of the video camera 100 from the power source is stopped.

The start/stop button is a button used for instructing the CPU 101 to start or temporarily stop recording of the video data which has been generated by the image capture unit 114 to the recording medium is to be started or stopped. The mode change button 113 is a button used for instructing the CPU 101 to change the operation mode of the video camera 100 to such as the image capture mode or the playback mode.

The menu button is a button used for instructing the CPU 101 to display or hide a menu screen of the video camera 100. The menu screens of the video camera 100 includes a menu screen for controlling the video camera 100, and a menu screen for changing the settings of the video camera 100. These menu screens are stored in the ROM 115.

In the case of displaying a menu screen, the CPU 101 reads out the menu screen to be displayed from the ROM 115, and supplies the menu screen that has been read out to the display unit 111 and the data processing unit 109. At this time, the CPU 101 superposes a cursor on the menu screen. The display unit 111 and the data processing unit 109 superpose the menu screen supplied from the CPU 101 on the video data supplied from the image capture unit 114 or the recording unit 104. Thus, the same menu screen is displayed on the display unit 111 and the television 200.

In the case of non displaying the menu screen, the CPU 101 stops the supply of the menu screen to the display unit 111 and the data processing unit 109.

The + button and the − button are buttons used for moving the cursor on the menu screen. The SET button is a button used for instructing the CPU 101 to execute the item selected by the cursor. The + button, the − button, and the SET button are also used in changing the menu screen.

Also, the operating unit 112 includes a playback button, a stop button, a pause button, a fast forward button, a rewind button, and so forth. These buttons are buttons used for instructing the CPU 101 to execute the playback, the stop, the pause, the fast forward, and the rewind operations of the video data recorded in the recording medium.

As described above, the mute image and menu screens are stored in the ROM 115. A plurality of icons used for informing the user of the state of the video camera 100 are also stored in the ROM 115. Also, a computer program used for controlling the operation of the video camera 100 is also stored in the ROM 115. Note that the communication apparatus 100 is not restricted to a video camera. For example, the communication apparatus 100 can be an image capture apparatus such as a video camera, a still camera, a cell phone with camera, or the like.

Next, an example of the configuration of the television 200 will be described. The television 200 includes, as shown in FIG. 2, a CPU 201, a tuner unit 202, a communication unit 203, a command processing unit 204, a display unit 205, an operating unit 206, a remote control reception unit 207, and a ROM 208.

The CPU (Central Processing Unit) 201 controls the operation of the television 200 in accordance with a computer program stored in the ROM 208.

The tuner unit 202 receives an analog television broadcasting, a digital television broadcasting, or cable television broadcasting in accordance with the selection by the user. The television broadcasting that the tuner unit 202 receives can be selected from a remote control unit 209. The television channel that the tuner unit 202 receives can also be selected from the remote control unit 209. The video data included in the analog television broadcasting, the digital television broadcasting, or the cable television broadcasting is displayed on the display unit 205. Also, the audio data included in the analog television broadcasting, the digital television broadcasting, or the cable television broadcasting can be output from a speaker unit (not shown).

The communication unit 203 includes a HDMI terminal used for connecting the HDMI cable 300. The communication unit 203 can receive the video data, the audio data, and the auxiliary data transmitted from the video camera 100 via the TMDS line 301. The video data transmitted from the video camera 100 is displayed on the display unit 205. The audio data transmitted from the video camera 100 is output from the speaker unit (not shown). Also, the auxiliary data transmitted from the video camera 100 is supplied to the CPU 201.

Also, the communication unit 203 can receive the CEC command from the video camera 100 via the CEC line 302. In the case of receiving the CEC command from the video camera 100, the communication unit 203 supplies the received CEC command to the CPU 201 via the command processing unit 204.

Also, the communication unit 203 can also transmit a CEC command for controlling the video camera 100 to the video camera 100 via the CEC line 302. A CEC command for controlling the video camera 100 is generated by the CPU 201, and is supplied to the communication unit 203 via the command processing unit 204. The communication unit 203 receives the CEC command from the video camera 100 via the CEC line 302. The CEC command sent from the video camera 100 is supplied from the communication unit 203 to the CPU 201 via the command processing unit 204.

A CEC command for controlling the video camera 100 is generated by the CPU 201, and is supplied to the communication unit 203 via the command processing unit 204. The CEC command for controlling the video camera 100 is supplied from the command processing unit 204 to the communication unit 203, and is transmitted to the video camera 100 via the CEC line 302.

The display unit 205 includes a display device such as a liquid crystal display or the like. The display unit 205 can display the video data supplied from either the tuner unit 202 or communication unit 203. The display unit 205 can also display the mute image stored in the ROM 208.

The operating unit 206 is a user interface for operating the television 200. Also, the operating unit 206 includes, similar to the remote control unit 209, a plurality buttons used for operating the television 200. Each button included in the operating unit 206 is configured by a switch, touch panel, or the like.

In the case of receiving the remote control signal transmitted from the remote control unit 209, the remote control reception unit 207 supplies the received remote control signal to the CPU 201. Thus, the instruction by the user is input to the CPU 201 via the remote control unit 209 and the remote control reception unit 207. The CPU 201 generates the CEC command corresponding to the remote control signal from the remote control reception unit 207, and supplies the generated the CEC command to the communication unit 203 via the command processing unit 204. The CEC command supplied to the communication unit 203 is transmitted to the video camera 100 via the CEC line 302. Thus, the user can control the video camera 100 by using the remote control unit 209.

As described above, the mute image, and menu screens are stored in the ROM 208. The a plurality icons for informing the user of the state of the television 200, and the EDID of the television 200, and so forth are also stored in the ROM 208. Also, the computer program for controlling the operation of the television 200 is also stored in the ROM 208.

The remote control unit 209 is a user interface for operating the video camera 100 and the television 200, and includes a plurality buttons for operating the video camera 100, and a plurality buttons for operating the television 200. Each button included in the remote control unit 209 is configured of a switch or a touch panel, or the like.

The remote control unit 209 includes a first power button, a television broadcasting selection button, a channel button, an external input button, a menu button, a + button, a − button, and a SET button, and so forth. These buttons are used for operating the television 200.

The first power button is a button used for instructing the CPU 201 that the state of the television 200 is to be changed to a power on state or power off state. The power on state is a state in which power can be supplied to the whole of the television 200 from a power source (not shown). The power off state is a state in which supply of power from the power source to a part of the television 200 or the whole of the television 200 is stopped.

The television broadcasting selection button is a button used for instructing the CPU 201 to select one of analog television broadcasting, digital television broadcasting, and cable television broadcasting, and for instructing to the CPU 201 to make the tuner unit 202 receive the selected television broadcasting. The channel button is a button used for selecting a television channel that the tuner unit 202 receives.

The external input button is a button used for selecting one of the video data received by the tuner unit 202, and the video data transmitted from the video camera 100, and displaying the selected video data on the display unit 205.

The menu button is a button used for instructing the CPU 201 to display or non display the menu screen of the television 200. The menu screens of the television 200 includes a menu screen used for controlling the television 200, and a menu screen for changing the settings of the television 200. These menu screens are stored in the ROM 208.

In the case of displaying a menu screen, the CPU 201 reads out the menu screen to be displayed from the ROM 208, and supplies the menu screen that has been read out to the display unit 205. At this time, the CPU 201 superposes the cursor on the menu screen. The display unit 205 superposes the menu screen supplied from the CPU 201 on the video data supplied from the tuner unit 202 or the communication unit 203. Thus, the menu screen of the television 200 is displayed on the display unit 205. In the case of non displaying the menu screen, the CPU 201 stops supplying the menu screen to the display unit 205. The + button and the − button are buttons for moving the cursor on the menu screen. The SET button is a button used for instructing the CPU 201 to execute the item selected by the cursor. The + button, the − button, and the SET button are also used in changing the menu screens.

Note that, in a case where the menu screen of the video camera 100 is displayed on the television 200, the + button, the − button, and the SET button can also operate the cursor on the menu screen thereof. In this case, the CEC commands corresponding to the operation as to the + button, the − button, and the SET button are transmitted from the television 200 to the video camera 100 via the CEC line 302.

Also, the remote control unit 209 includes a second power button, a play button, a stop button, a pause button, a fast forward button, a rewind button, a start/stop button and a menu button, and so forth. These buttons are buttons used for operating the video camera 100.

The second power button is a button used for instructing the CPU 201 to transmit a power on command or power off command to the video camera 100 via the CEC line 302. The power on command is a CEC command used for instructing the CPU 101 to change the state of the video camera 100 to a power on state. The power off command is a CEC command used for instructing the CPU 101 to change the state of the video camera 100 to a power off state.

The playback button, the stop button, and the pause button are buttons used for instructing the CPU 201 to transmit a play command, a stop command, and a pause command to the video camera 100 via the CEC line 302. Also, the fast forward button, and the rewind button are buttons used for instructing the CPU 201 to transmit a fast forward command, and a rewind command to the video camera 100 via the CEC line 302. These commands are CEC commands used for instructing the CPU 101 to execute the play, stop, pause, fast forward, and rewind of operation of the video data recorded in the recording medium.

The start/stop button is a button used for instructing the CPU 201 to transmit a recording command or a recording pause command to the video camera 100 via the CEC line 302. The recording command is a CEC command used for instructing the CPU 101 to start recording of the video data generated by the image capture unit 114 as to the recoding medium. The recording pause command is a CEC command used for instructing the CPU 101 to pause recording of the video data generated by the image capture unit 114 as to the recording medium.

The menu button is a button used for instructing the CPU 201 to transmit a menu on command or a menu off command to the video camera 100 via the CEC line 302.

The menu on command is a CEC command used for instructing the CPU 101 to display of the menu screen of the video camera 100. In the case of displaying a menu screen, the CPU 101 reads out the menu screen to be displayed from the ROM 115, and supplies the read menu screen to the display unit 111 and data processing unit 109. At this time, the CPU 101 superposes the cursor on the menu screen. The display unit 111 and data processing unit 109 superpose the menu screen supplied from the CPU 101 on the video data supplied from the image capture unit 114 or recording unit 104. Thus, the same menu screen is displayed on the display unit 111 and the television 200.

The menu off command is a CEC command used for instructing the CPU 101 to non display the menu screen of the video camera 100. In the case of non displaying the menu screen, the CPU 101 stops supplying the menu screen to the display unit 111 and data processing unit 109. Thus, the television 200 can stop display of the menu screen of the video camera 100.

Note that the external apparatus 200 is not restricted to a television receiver. For example, the external apparatus 200 can be a personal computer having a display. Next, process executed by the video camera 100 according to the first embodiment will be described with reference to FIGS. 1 through 3.

Figure 3:
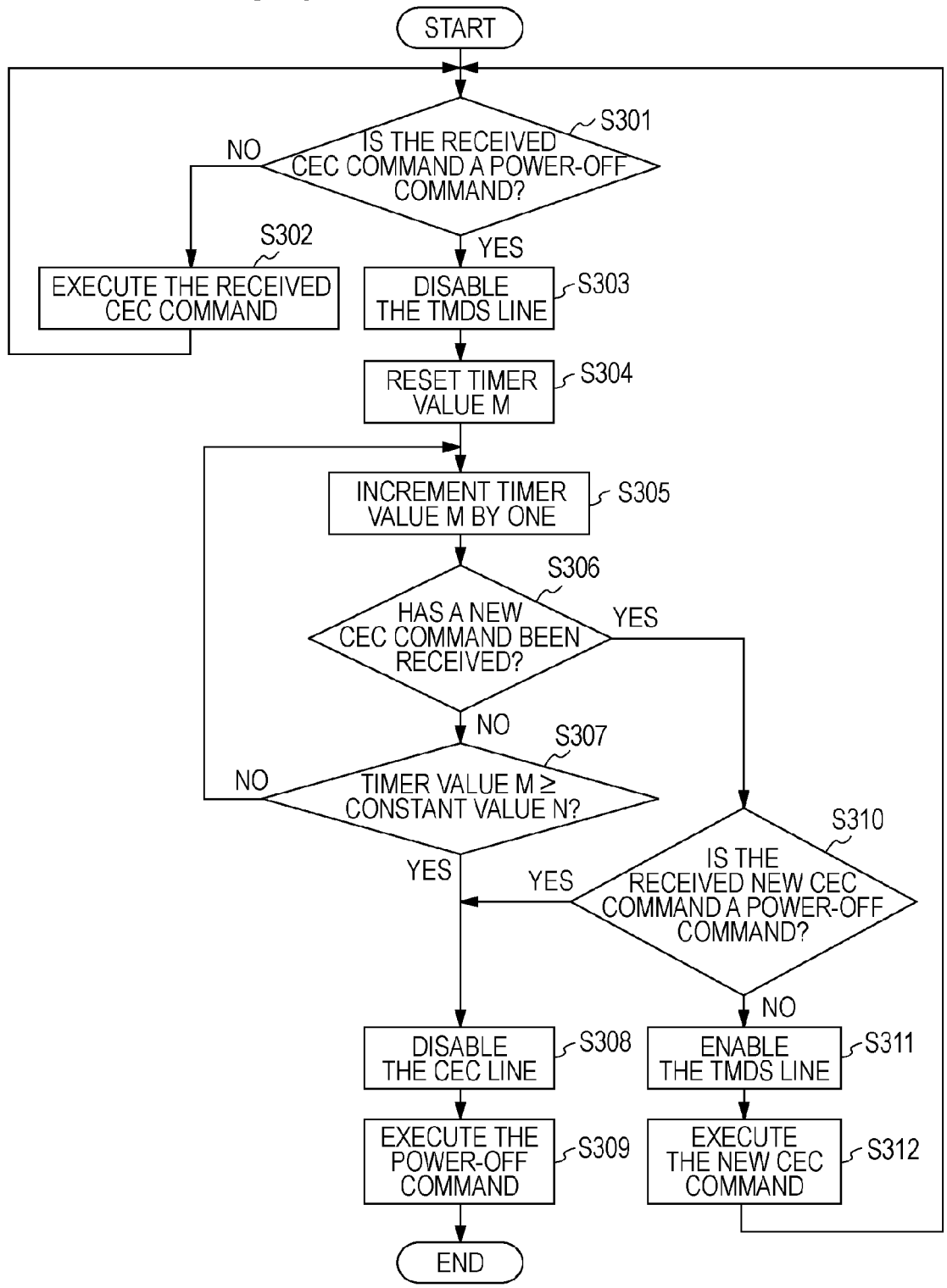
FIG. 3 is a flowchart illustrating an example of process executed at a communication apparatus according to the first exemplary embodiment of the present invention.

FIG. 3 is a flowchart illustrating an example of process executed by the video camera 100 according to the first embodiment. The process shown in the flowchart in FIG. 3 is process that is executed when the video camera 100 and television 200 are connected via the HDMI cable 300, and the video camera 100 and television 200 are in a power on state. Note that the process shown in the flowchart in FIG. 3 is controlled by the CPU 101 executing the computer program stored in the ROM 115.

In a case where the user uses the remote control unit 209 to execute an operation for changing the video camera 100 to a power off state, the television 200 transmits the power off command to the video camera 100 via the CEC line 302. Also, in a case where the power button of the operating unit 206 is operated, and the television 200 is changed to a power off state, the television 200 transmits the power off command to the video camera 100 via the CEC line 302.

In step S301, the CPU 101 determines whether the CEC command received from the television 200 is the power off command. The CEC command received from the television 200 is supplied to the CPU 101 via communication unit 105, and command process unit 110. Thus, the CPU 101 can determine whether the CEC command received from the television 200 is the power off command.

If the power off command is received from the television 200 (YES in step S301), the process proceeds to step S303 from step S301. In this case, the CPU 101 stores the power off command that the communication unit 105 received from the television 200, in the RAM 103. If a CEC command other than the power off command is received from the television 200 (NO in step S301), the process proceeds to step S302 from step S301.

In step S302, the CPU 101 executes the CEC command other than the power off command. After the CPU 101 executes the CEC command other than the power off command, the process returns to step S301 from step S302.

In step S303, the CPU 101 supplies a TMDS disable signal to the TMDS driver 107a. The TMDS driver 107a which has received the TMDS disable signal changes from a normal state to a low consumption power state, and disables the TMDS line 301. If the TMDS line 301 is disabled, the communication unit 105 cannot transmit the video data, the audio data, and the auxiliary data to the television 200 via the TMDS line 301, but the consumption power of the communication unit 105 is reduced. After the TMDS line 301 is disabled, the process proceeds to step S304 from step S303.

In step S304, the CPU 101 resets the value M of the timer 102 to zero. After the CPU 101 resets the value M, the process proceeds to step S305 from step S304.

In step S305, the CPU 101 increments the value M of the timer 102 by one. After the CPU 101 increments the value M, the process proceeds to step S306 from step S305.

In step S306, the CPU 101 determines whether the new CEC command has been received from the television 200. If the new CEC command is received from the television 200, the new CEC command supplied to the CPU 101 via the communication unit 105, and command processing unit 110. Thus, the CPU 101 can determine whether the new CEC command has been received.

If the new CEC command has been received (YES in S306), the process proceeds to step S310 from step S306. If the new CEC command has not been received (NO in S306), the process proceeds to step S307 from step S306.

In step S307, the CPU 101 compares the value M and the constant value N stored in the ROM 115 to determine whether the value M exceeds the constant value N.

If the value M has exceeded the constant value N (YES in S307), the process proceeds to step S308 from step S307. In this case, the CPU 101 determines that a predetermined period of time T has elapsed from the power off command being received from the television 200. The predetermined period of time T is a period of time until the value M is equal to the constant value N. If the value M has not exceeded the constant value N (NO in S307), the process returns to step S305 from step S307.

In step S308, the CPU 101 supplies a CEC disable signal to the CEC driver 107b. The CEC driver 107b which has received the CEC disable signal changes from a normal state to a low consumption power state, and disables the CEC line 302. If the CEC line 302 is disabled, the communication unit 105 cannot receive a CEC command for controlling the video camera 100 from the television 200, and also cannot transmit a CEC command for controlling the television 200 to the television 200. After the CEC line 302 is disabled, the process proceeds to step S309 from step S308.

In step S309, the CPU 101 executes the power off command stored in the RAM 103. In this case, the CPU 101 starts process for changing the video camera 100 from a power on state to a power off state and eliminates the power off command thereof from the RAM 103. After then, the process ends.

In step S310, the CPU 101 determines whether the new CEC command received in step S306 is the power off command. If the user has operated the power button of the operating unit 206 to change the television 200 to a power off state, the video camera 100 receives the power off command in step S306.

If the new CEC command received in step S306 is the power off command (Yes in S310), the process proceeds to step S308 from step S310. In this case, the CPU 101 ignores the new CEC command so as not to store the new CEC command in the RAM 103.

If the new CEC command received in step S306 is a CEC command other than the power off command (NO in S310), the process proceeds to step S311 from step S310. In this case, the CPU 101 discards the power off command stored in the RAM 103, and stores the new CEC command in the RAM 103. Thus, the CPU 101 can cancel execution of the power off command received by the video camera 100 from the television 200. If the power off command has been transmitted to the video camera 100 from the television 200 due to the user's erroneous operation, the user can cancel execution of the power off command thereof by executing an operation for transmitting the new CEC command to the video camera 100 from the television 200.

In step S311, the CPU 101 supplies the TMDS enable signal to the TMDS driver 107a. The TMDS driver 107a which received the TMDS enable signal returns to a normal state from a low consumption power state, and enables the TMDS line 301. If the TMDS line 301 is enabled, the video camera 100 can transmit the video data, the audio data, and the auxiliary data to the television 200 via the TMDS line 301.

After the TMDS driver 107a returns to a normal state from a low consumption power state, and the TMDS line 301 is enabled, the process proceeds to step S312 from step S311.

In step S312, the CPU 101 executes the new CEC command stored in the RAM 103. After the CPU 101 executes the new command, the process returns to step S301 from step S312.

Thus, even in the case of receiving the power off command, the video camera 100 according to the first embodiment does not disable the CEC line 302 immediately, and accordingly, a CEC command can be received from the television 200 until the predetermined period of time T elapses.

Also, in the case of receiving a CEC command other than the power off command from the television 200 until the predetermined period of time T elapses, the video camera 100 according to the first embodiment can cancel execution of the power off command. Thus, even in a case where the power off command has been transmitted to the video camera 100 due to the user's erroneous operation, the user can cancel the erroneous operation thereof immediately, and accordingly, operability improves.

Also, in the case of receiving the power off command from the television 200 again until the predetermined period of time T elapses, the video camera 100 according to the first embodiment can execute the power off command without waiting for elapse of the predetermined period of time T. Thus, the video camera 100 does not have to execute the power off command after elapsing of the predetermined period of time T, and accordingly, consumption power can be reduced.

Note that the CPU 101 may change the constant value N to be used in step S307 depending on whether the power source of the video camera 100 is a battery or AC power source. For example, the CPU 101 may set the constant value N in a case where the power source of the video camera 100 is a battery to a value smaller than the constant value N in a case where the power source of the video camera 100 is an AC power source. Also, for example, in a case where the power source of the video camera 100 is a battery, the CPU 101 may set the constant value N to a value equivalent to zero.

If the power source of the video camera 100 is a battery, the CPU 101 may change the constant value N to be used in step S307 according to the remaining amount of the battery of the video camera 100. For example, the smaller the remaining amount of the battery of the video camera 100 is, the smaller the CPU 101 may set the constant value N. Also, for example, in a case where the remaining amount of the battery of the video camera 100 becomes a predetermined threshold or less, the CPU 101 may set the constant value N to a value equivalent to zero.

Next, a second embodiment of the present invention will be described with reference to FIGS. 1, 2, and 4. In the second embodiment, description of components similar to those of the first embodiment will be omitted and the component different from the first embodiment will be described.

The second embodiment will describe process executed at the video camera 100 in a case where HDMI connection between the video camera 100 and television 200 has been disconnected before the predetermined period of time T elapses from disabling of the TMDS line 301.

Figure 4:
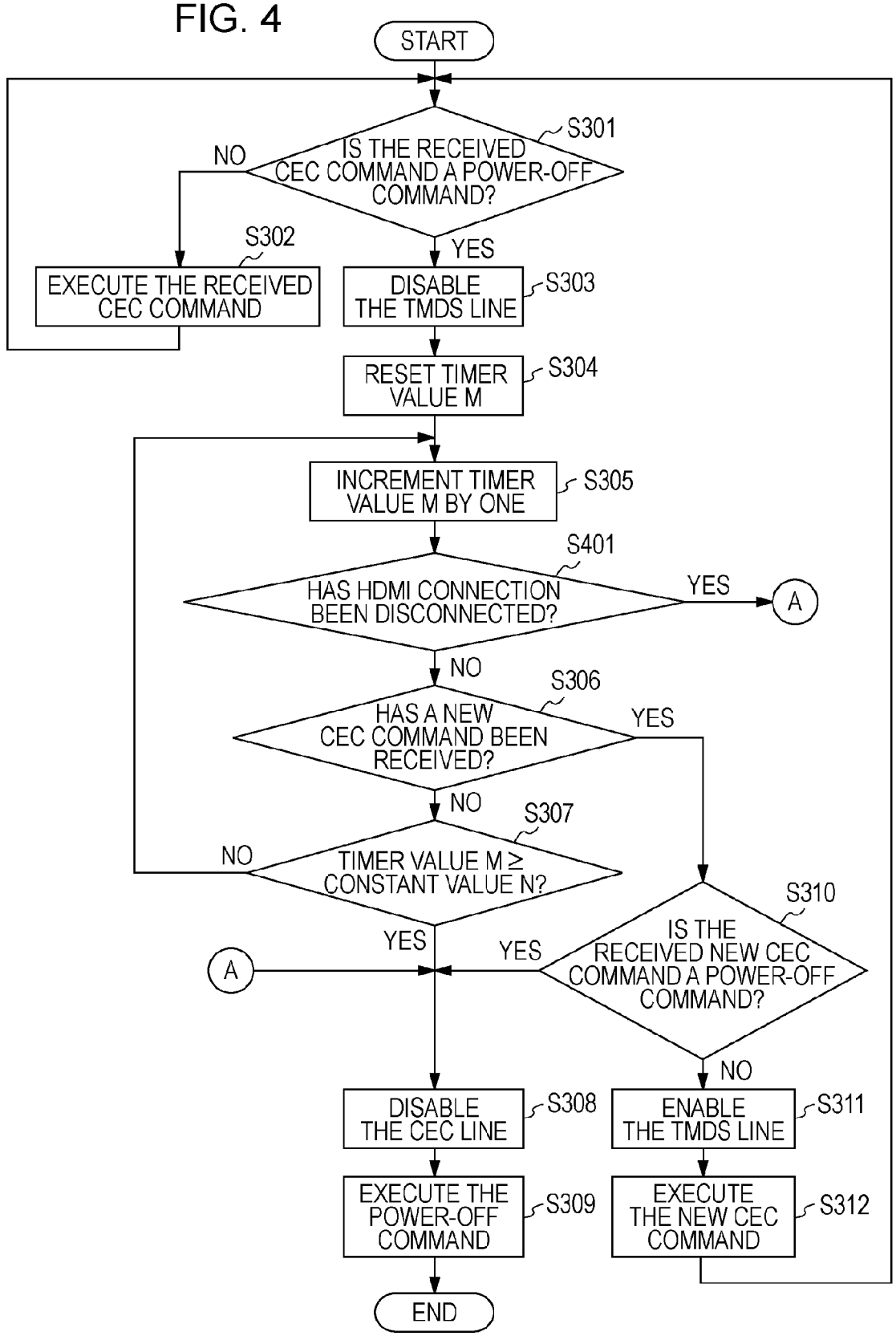
FIG. 4 is a flowchart illustrating an example of process executed at a communication apparatus according to the second embodiment of the present invention.

FIG. 4 is a flowchart illustrating an example of the process executed at the video camera 100 according to the second embodiment. The process that the flowchart in FIG. 4 illustrates is process to be executed when the video camera 100 and television 200 are connected via the HDMI cable 300 and the video camera 100 and television 200 are in a power on state. Note that the process illustrated in the flowchart in FIG. 4 is controlled by the CPU 101 executing the computer program stored in the ROM 115.

The process executed in steps S301 through S312 in FIG. 4 is the same as the process executed in steps S301 through S312 in FIG. 3. Accordingly, description regarding the process executed in steps S301 through S312 in FIG. 4 will be omitted.

After the process in step S305 is executed, the process proceeds to step S401 from step S305.

In step S401, the CPU 101 determines whether the HDMI connection between the video camera 100 and television 200 has been disconnected. The connection detecting unit 106 detects whether the HDMI connection between the video camera 100 and television 200 has been disconnected. The detection result by the connection detecting unit 106 is informed to the CPU 101, whereby the CPU 101 can determine whether the HDMI connection between the video camera 100 and television 200 has been disconnected.

If the HDMI cable 300 is disconnected from the video camera 100, the HPD signal cannot be received, whereby the connection detecting unit 106 can detect disconnection of the HDMI connection between the video camera 100 and television 200. Also, if the television 200 changes to a power off state, the HPD signal changes from high to low, whereby the connection detecting unit 106 can detect disconnection of the HDMI connection between the video camera 100 and television 200. Note that the operation for changing the television 200 to a power off state is executed by the remote control unit 209 or the operating unit 206.

If the HDMI connection between the video camera 100 and television 200 has been disconnected (YES in S401), the process proceeds to step S308 from step S401. If the HDMI connection between the video camera 100 and television 200 has not been disconnected (NO in S401), the process proceeds to step S306 from step S401.

Thus, in a case where the HDMI connection between the video camera 100 and television 200 has been disconnected before the predetermined period of time T elapses, the video camera 100 according to the second embodiment can execute the power off command without waiting for the predetermined period of time T. Thus, the video camera 100 according to the second embodiment does not have to execute the power off command after waiting for elapse of the predetermined period of time T, whereby consumption power can be reduced as compared to the first embodiment.

Also, the video camera 100 according to the second embodiment executes process other than the process executed in step S401 in FIG. 4 in the same way as with the first embodiment, and accordingly, can obtain the same results as those in the first embodiment.

Next, a third embodiment of the present invention will be described with reference to FIGS. 1, 2, and 5. In the third embodiment, description of components similar to those of the first embodiment will be omitted and the component will be described.

The third embodiment will describe process executed at the video camera 100 in a case where an instruction for changing the video camera 100 to a power off state has been input to the CPU 101 until the predetermined period of time T elapses from the TMDS line 301 being disabled.

Figure 5:
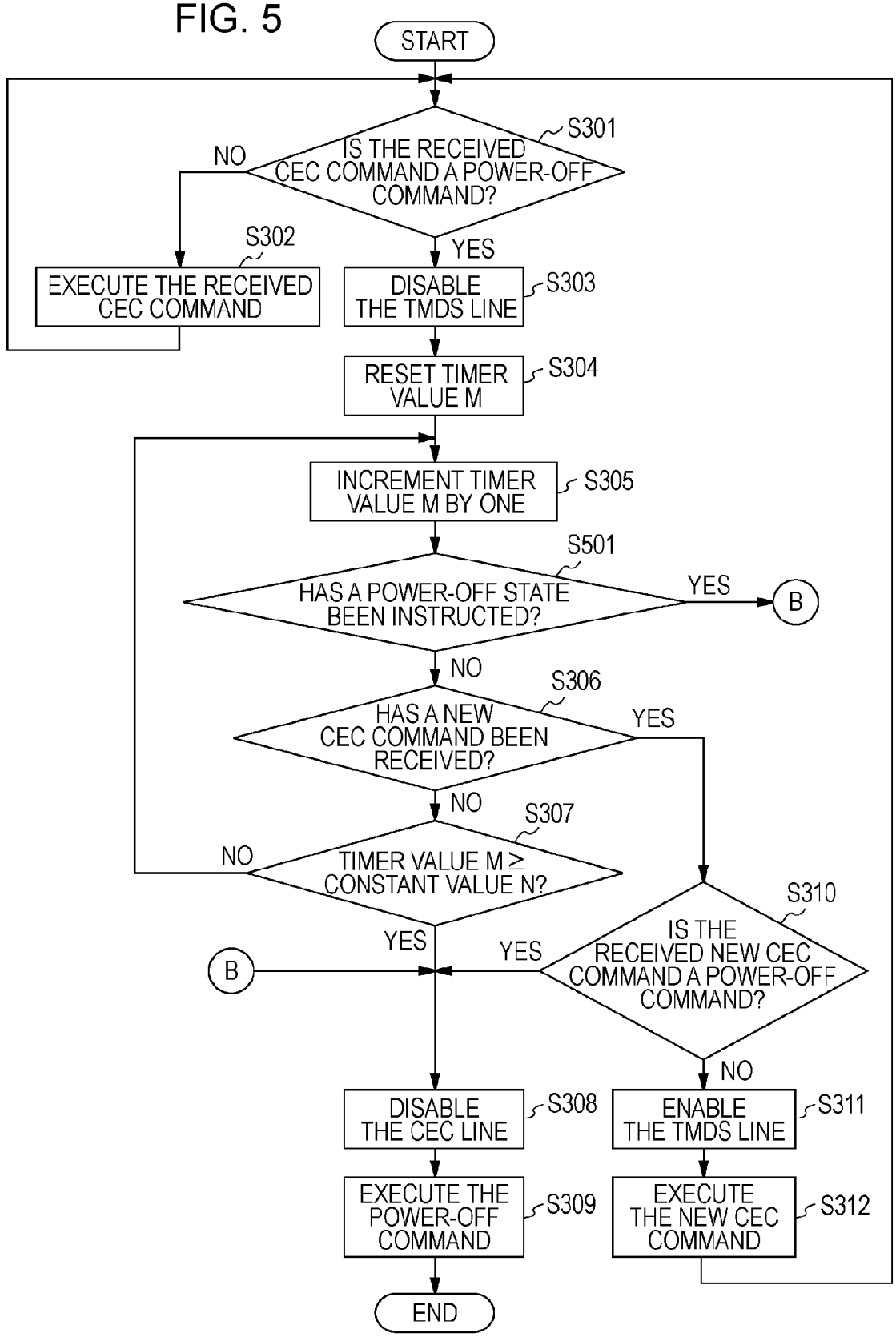
FIG. 5 is a flowchart illustrating an example of process executed at a communication apparatus according to the third embodiment of the present invention.

FIG. 5 is a flowchart illustrating an example of the process executed at the video camera 100 according to the third embodiment. The process that the flowchart in FIG. 5 illustrates is process to be executed when the video camera 100 and television 200 are connected via the HDMI cable 300, and the video camera 100 and television 200 are in a power on state. Note that the process illustrated in the flowchart in FIG. 5 is controlled by the CPU 101 executing the computer program stored in the ROM 115.

The process executed in steps S301 through S312 in FIG. 5 is the same as the process executed in steps S301 through S312 in FIG. 3. Accordingly, description regarding the process executed in steps S301 through S312 in FIG. 5 will be omitted.

After the process in step S305 is executed, the process proceeds to step S501 from step S305.

In step S501, the CPU 101 determines whether the instruction for changing the video camera 100 to a power off state has been input to the CPU 101. The user operates the power button within the operating unit 112, whereby the instruction for changing the video camera 100 to a power off state can be input to the CPU 101.

If the instruction for changing the video camera 100 to a power off state has been input to the CPU 101 (YES in S501), the process proceeds to step S308 from step S501. If the instruction for changing the video camera 100 to a power off state has not been input to the CPU 101 (NO in S501), the process proceeds to step S306 from step S501.

Thus, if the instruction for changing the video camera 100 to a power off state has been input to the CPU 101 before the predetermined period of time T elapses, the video camera 100 according to the third embodiment can execute the power off command without waiting for the predetermined period of time T. Thus, the video camera 100 according to the third embodiment does not have to execute the power off command after waiting for elapse of the predetermined period of time T, whereby consumption power can be reduced as compared to the first embodiment.

Also, the video camera 100 according to the third embodiment executes process other than the process executed in step S501 in FIG. 5 in the same way as with the first embodiment, and accordingly, can obtain the same results as those in the first embodiment.

Note that the third embodiment may be implemented in combination with the second embodiment. In this case, the video camera 100 according to the third embodiment can obtain the same results as those in the second embodiment.

Next, a fourth embodiment of the present invention will be described with reference to FIGS. 1, 2, and 6. In the fourth embodiment, description of components common to those of the first embodiment, description will be omitted and the components different from the first embodiment will be described.

The fourth embodiment will describe process executed at the video camera 100 in a case where a particular button within the operating unit 112 has been operated until the predetermined period of time T elapses from the TMDS line 301 being disabled.

Figure 6:
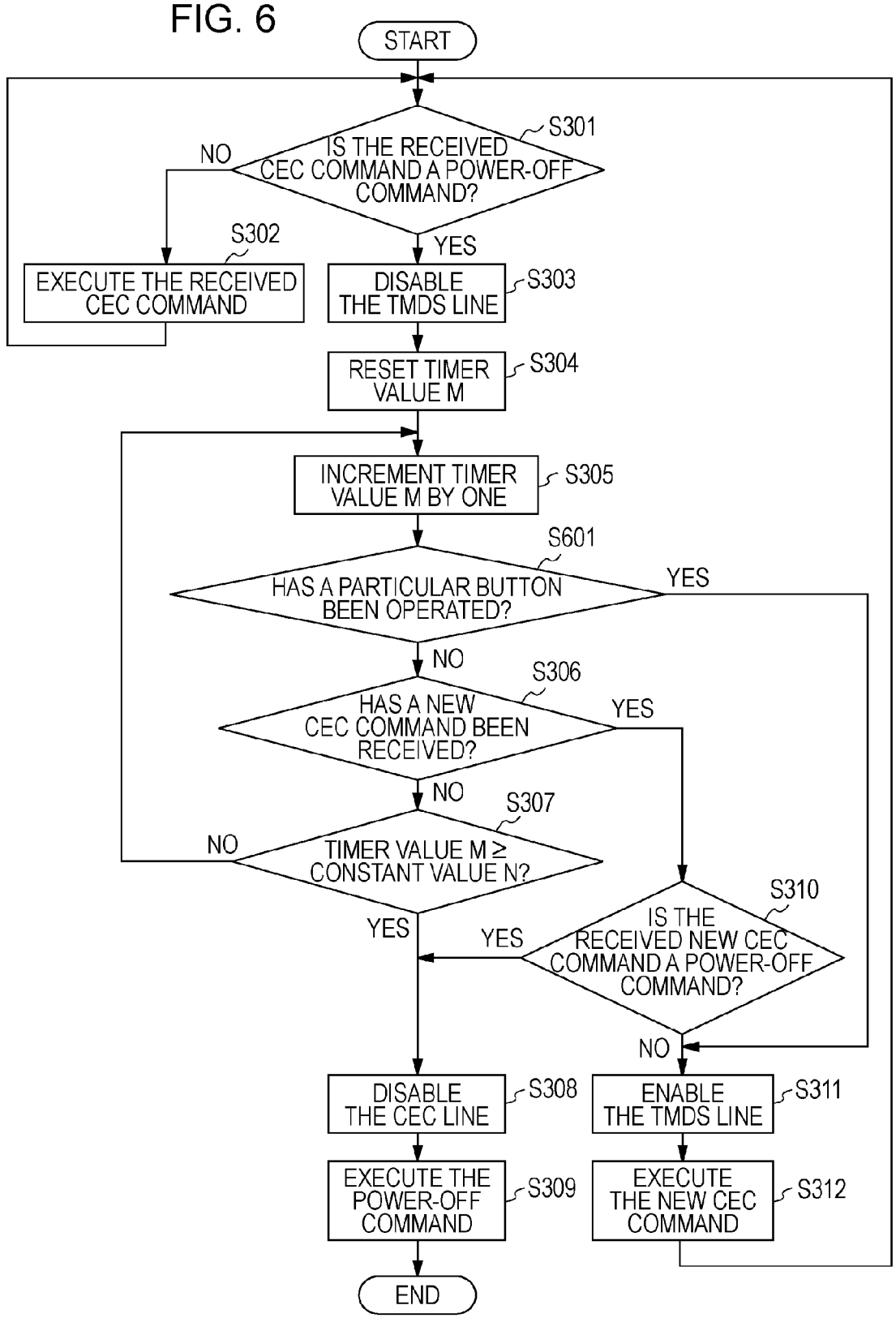
FIG. 6 is a flowchart illustrating an example of process executed at a communication apparatus according to the fourth embodiment of the present invention.

FIG. 6 is a flowchart illustrating an example of the process executed at the video camera 100 according to the fourth embodiment. The process that the flowchart in FIG. 6 illustrates is process to be executed when the video camera 100 and television 200 are connected via the HDMI cable 300, and the video camera 100 and the television 200 are in a power on state. Note that the process illustrated in the flowchart in FIG. 6 is controlled by the CPU 101 executing the computer program stored in the ROM 115.

The process executed in steps S301 through S312 in FIG. 6 is the same as the process executed in steps S301 through S312 in FIG. 3. Accordingly, description regarding the process executed in steps S301 through S312 in FIG. 6 will be omitted.

After the process in step S305 is executed, the process proceeds to step S601 from step S305.

In step S601, the CPU 101 determines whether a particular button within the operating unit 112 has been operated. If depressing, selection, or rotation of a particular button within the operating unit 112 has been detected, the CPU 101 determines that the particular button has been operated.

In fourth embodiment, the particular button is all or a part of the buttons within the operating unit 112. A button using as the particular button may be changed according to the operation mode of the video camera 100. For example, if the operation mode of the video camera 100 is the image capture mode, the recording button and recording pause button may be used as particular buttons. Also, if the operation mode of the video camera 100 is the playback mode, the playback button, pause button, fast forward button, and rewind button may be used as particular buttons.

Also, a button using as the particular button is select by user arbitrarily. In this case, information indicating the button selected by the user is stored in the RAM 103. If a particular button within the operating unit 112 has been operated (YES in S601), the process proceeds to step S311 from step S601. If a particular button within the operating unit 112 has not been operated (NO in S601), the process proceeds to step S306 from step S601.

Thus, in a case where a particular button within the operating unit 112 has been operated before the predetermined period of time T elapses, the video camera 100 according to the fourth embodiment can cancel execution of the power off command without waiting for elapse of the predetermined period of time T. Thus, even in the event that the user has transmitted the power off command to the video camera 100 from the television 200 by mistake, the user operates particular button within the operating unit 112, whereby the video camera 100 can cancel execution of the power off command. As a result thereof, the user's erroneous operation can be canceled immediately, and accordingly, operability improves.

Also, the video camera 100 according to the fourth embodiment executes process other than the process executed in step S601 in FIG. 6 in the same way as with the first embodiment, and accordingly, can obtain the same results as those in the first embodiment.

Note that the fourth embodiment may be implemented in combination with at least one of the second and third embodiments. In this case, the video camera 100 according to the fourth embodiment can obtain the same results as those in at least one of the second and third embodiments.

Also, with the fourth embodiment, description has been made regarding the case where examples of the operation mode of the video camera 100 include the image capture mode and playback mode, but the operation mode is not restricted to these. The image capture mode may be replaced with a moving image capture mode for capturing a moving image, and a still image capture mode for capturing a still image. Similarly, the playback mode may also be replaced with a moving image playback mode for reproducing a moving image, and a still image playback mode for reproducing a still image.

Next, a fifth embodiment of the present invention will be described with reference to FIGS. 1, 2, and 7. In the fifth embodiment, description of components similar to those of the first embodiment, description will be omitted and the components different from the first embodiment will be described.

Figure 7:
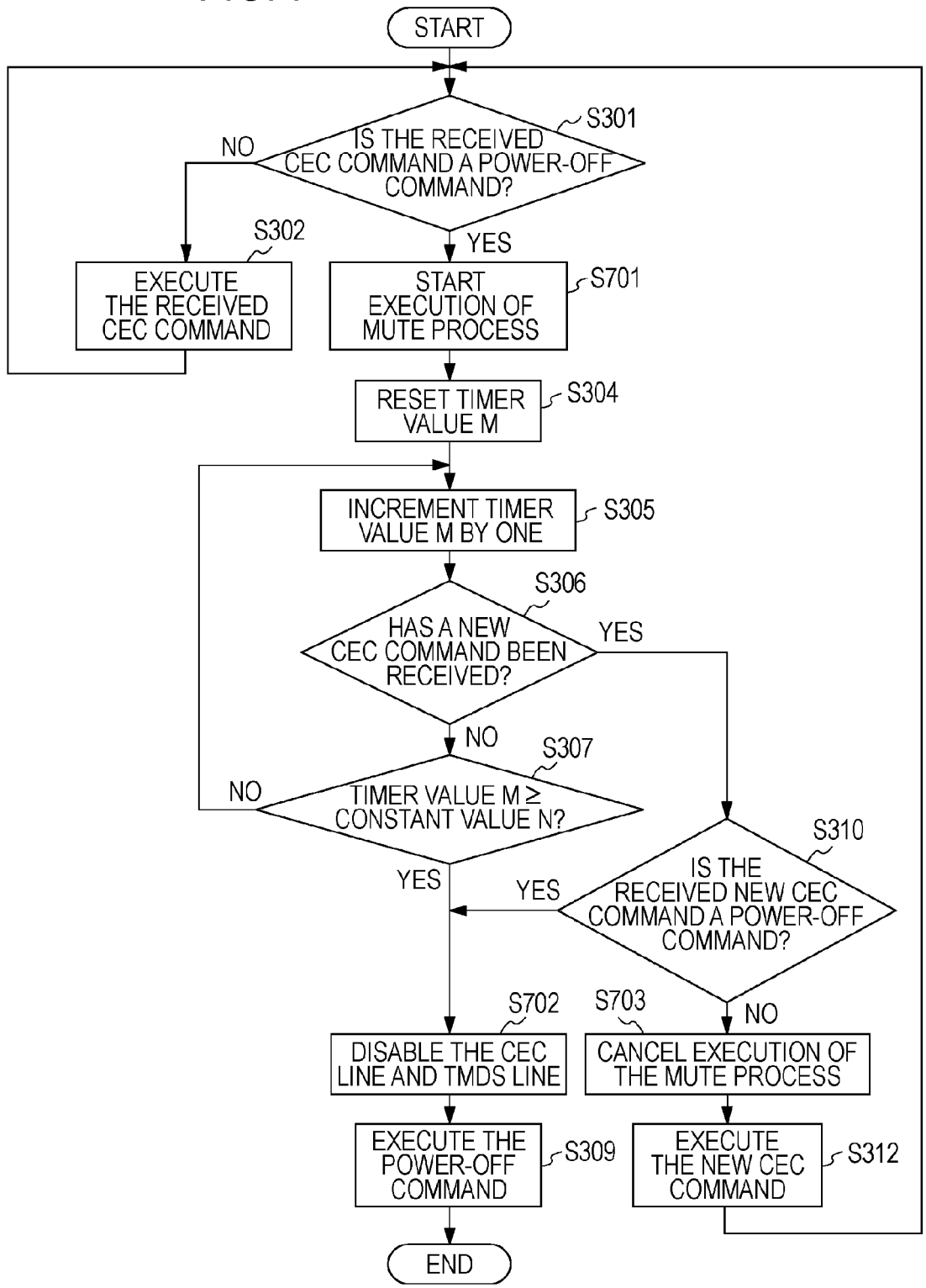
FIG. 7 is a flowchart illustrating an example of process executed at a communication apparatus according to the fifth embodiment of the present invention.

FIG. 7 is a flowchart illustrating an example of the process executed at the video camera 100 according to the fifth embodiment. The process that the flowchart in FIG. 7 illustrates is process to be executed when the video camera 100 and television 200 are connected via the HDMI cable 300, and the video camera 100 and television 200 are in a power on state. Note that the process illustrated in the flowchart in FIG. 7 is controlled by the CPU 101 executing the computer program stored in the ROM 115.

The process executed in steps S301, S302, S304 through S307, S309, S310, and S312 in FIG. 7 is the same as the process executed in steps S301, S302, S304 through S307, S309, S310, and S312 in FIG. 3. Accordingly, description regarding the process executed in steps S301, S302, S304 through S307, S309, S310, and S312 in FIG. 7 will be omitted.

If the power off command is received from the television 200 (YES in step S301), the process proceeds to step S701 from step S301.

In step S701, the CPU 101 starts execution of the mute process. In this case, the CPU 101 does not supply a TMDS disable signal to the TMDS driver 107a. After the CPU 101 starts execution of the mute process, the process proceeds to step S304 from step S701.

In a case where execution of the mute process is started, the CPU 101 controls the mute unit 108 to transmit the mute instruction to the television 200 continuously until execution of the mute process is canceled. In this case, the CPU 101 controls the data processing unit 109 and communication unit 105 to transmit the mute image and silent data stored in the ROM 115 to the television 200 continuously, until the mute process is cancelled. Note that the mute image and silent data stored in the ROM 115 are transmitted to the television 200 via the TMDS line 301.

While the mute instruction is received from the video camera 100, the television 200 displays the mute image stored in the ROM 208 on the display unit 205. Also, while the mute instruction is received from the video camera 100, the television 200 mutes the audio output from the speaker unit. Thus, while the mute process is executed, the television 200 also executes the mute process in the same way as with the video camera 100.

Note that the reason why the mute image and silent data is transmitted to the television 200 as well as the mute instruction is because there is a possibility that there is an apparatus where the television 200 cannot execute the mute instruction. In the case of a apparatus where the television 200 cannot execute the mute instruction, the television 200 displays the mute image received from the video camera 100 on the display unit 205. Also, in this case, the television 200 outputs the silent data received from the video camera 100 from the speaker unit (not shown).

In step S702, the CPU 101 supplies the TMDS disable signal to the TMDS driver 107a, and supplies the CEC disable signal to the CEC driver 107b. At this time, the CPU 101 cancels execution of the mute process. After the CPU 101 supplies the TMDS disable signal and supplies the CEC disable signal, the process proceeds to step S309 from step S702.

The TMDS driver 107a which received the TMDS disable signal changes to a low consumption power state from a normal state, and disables the TMDS line 301. In a case where the TMDS line 301 has been disabled, the communication unit 105 cannot transmit the video data, the audio data, and the auxiliary data to the television 200 via the TMDS line 301, but the consumption power of the communication unit 105 is reduced. The CEC driver 107b which received the CEC disable signal changes to a low consumption power state from a normal state, and disables the CEC line 302. In a case where the CEC line 302 has been disabled, the communication unit 105 cannot receive a CEC command for controlling the video camera 100 from the television 200, and also cannot transmit a CEC command for controlling the television 200 to the television 200.

In step S703, the CPU 101 cancels execution of the mute process. In a case where execution of the mute process has been canceled, the CPU 101 ends the process for transmitting the mute instruction, the mute image, and the silent data to the television 200. After the CPU 101 cancels execution of the mute process, the CPU 101 starts process for transmitting the same video data as the video data displayed on the display unit 111 to the television 200. As a result thereof, the same video is displayed on the display unit 111 and television 200.

After execution of the mute process is canceled in step S703, the process proceeds to step S312 from step S703.

Note that a period of time until execution of the mute process is canceled is shorter than a period of time until the TMDS driver 107a is returned to a normal state from a low consumption power state, and accordingly, with the fifth embodiment, the period of time until the new CEC command is executed can be reduced as compared to the first embodiment.

Thus, even in the case of receiving the power off command, the video camera 100 according to the fifth embodiment does not disable the TMDS line 301 immediately, and accordingly, a period of time from execution of the power off command being canceled until the new CEC command is executed can be reduced.

Also, the video camera 100 according to the fifth embodiment executes process other than the process executed in steps S701 through S703 in FIG. 7 in the same way as with the first embodiment, and accordingly, can obtain the same results as those in the first embodiment.

Next, a sixth embodiment of the present invention will be described with reference to FIGS. 1, 2, and 8. With the sixth embodiment, with regard to portions common to the first, second, and fifth embodiments, description thereof will be omitted, and portions different from the second embodiment will be described.

Figure 8:
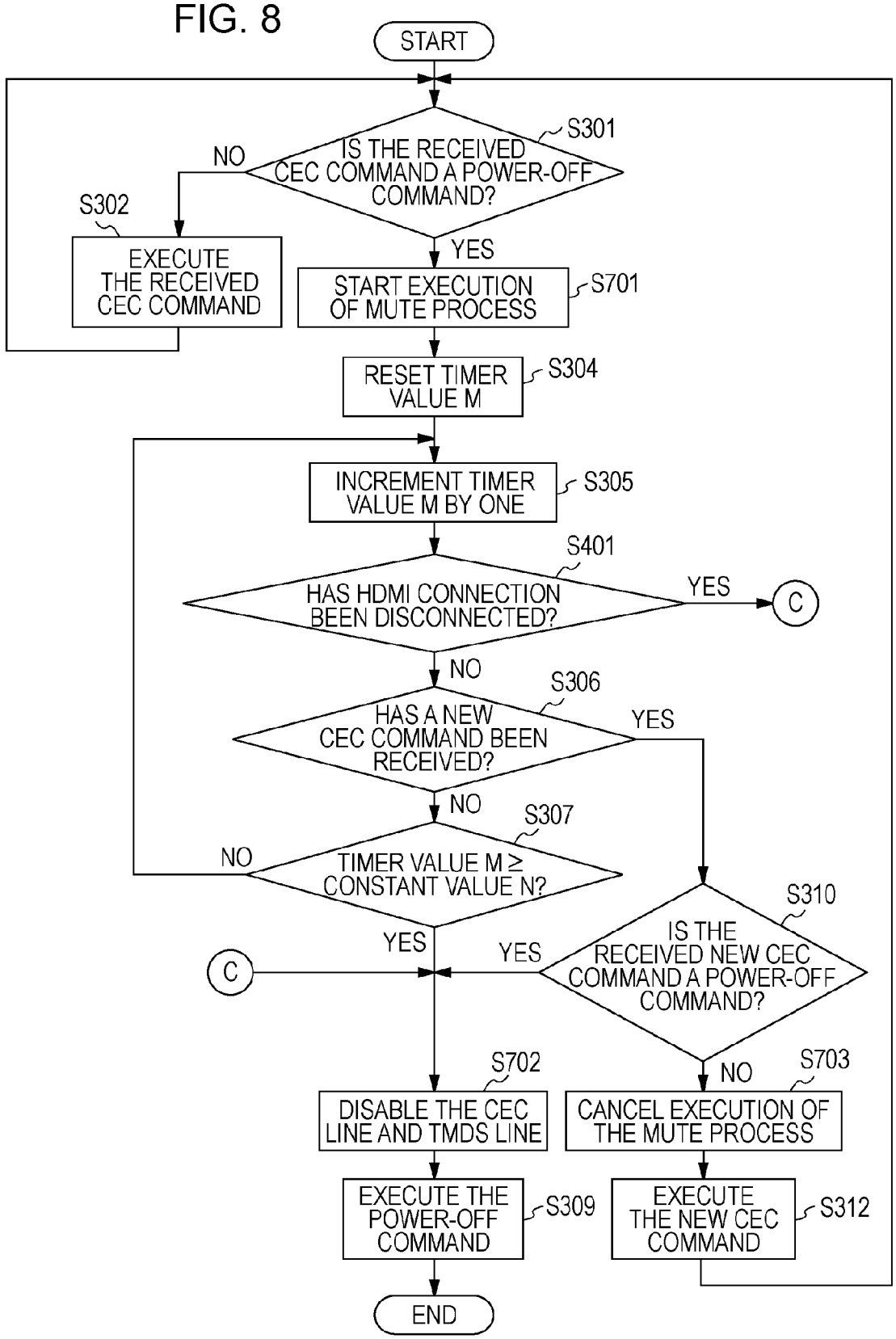
FIG. 8 is a flowchart illustrating an example of process executed at a communication apparatus according to the sixth embodiment of the present invention.

The process executed in steps S301, S302, S304 through S307, S309, S310, and S312 in FIG. 8 is the same as the process executed in steps S301, S302, S304 through S307, S309, S310, and S312 in FIG. 3. The process executed in step S401 in FIG. 8 is the same as the process executed in step S401 in FIG. 4. The process executed in steps S701 through S703 in FIG. 8 is the same as the process executed in steps S701 through S703 in FIG. 7. Accordingly, description regarding the process executed in all the steps in FIG. 8 will be omitted.

Thus, even in the case of receiving the power off command, the video camera 100 according to the sixth embodiment does not disable the TMDS line 301 immediately, and accordingly, a period of time since execution of the power off command has been canceled until the new CEC command is executed can be reduced.

Also, the video camera 100 according to the sixth embodiment executes process other than the process executed in steps S701 through S703 in FIG. 8 in the same way as with the second embodiment, and accordingly, can obtain the same results as those in the second embodiment.

Next, a seventh embodiment of the present invention will be described with reference to FIGS. 1, 2, and 9. In the seventh embodiment, description of components similar to those of the first embodiment will be omitted and the component different from the first embodiment will be described.

The process executed in steps S301, S302, S304 through S307, S309, S310, and S312 in FIG. 9 is the same as the process executed in steps S301, S302, S304 through S307, S309, S310, and S312 in FIG. 3. The process executed in step S501 in FIG. 9 is the same as the process executed in step S501 in FIG. 5. The process executed in steps S701 through S703 in FIG. 9 is the same as the process executed in steps S701 through S703 in FIG. 7. Accordingly, description regarding the process executed in all the steps in FIG. 9 will be omitted.

Thus, even in the case of receiving the power off command, the video camera 100 according to the seventh embodiment does not disable the TMDS line 301 immediately, and accordingly, a period of time from execution of the power off command being canceled until the new CEC command is executed can be reduced.

Also, the video camera 100 according to the seventh embodiment executes process other than the process executed in steps S701 through S703 in FIG. 9 in the same way as with the third embodiment, and accordingly, can obtain the same results as those in the third embodiment.

Note that the seventh embodiment can be implemented in combination with the sixth embodiment. In this case, the video camera 100 according to the seventh embodiment can obtain the same results as those in the sixth embodiment.

Next, an eighth embodiment of the present invention will be described with reference to FIGS. 1, 2, and 10. With the eighth embodiment, with regard to portions common to the first, fourth, and fifth embodiments, description thereof will be omitted, and portions different from the fourth embodiment will be described.

The process executed in steps S301, S302, S304 through S307, S309, S310, and S312 in FIG. 10 is the same as the process executed in steps S301, S302, S304 through S307, S309, S310, and S312 in FIG. 3. The process executed in step S601 in FIG. 10 is the same as the process executed in step S601 in FIG. 6. The process executed in steps S701 through S703 in FIG. 10 is the same as the process executed in steps S701 through S703 in FIG. 7. Accordingly, description regarding the process executed in all the steps in FIG. 10 will be omitted.

Thus, even in the case of receiving the power off command, the video camera 100 according to the eighth embodiment does not disable the TMDS line 301 immediately, and accordingly, a period of time from execution of the power off command being canceled until the new CEC command is executed can be reduced.

Also, the video camera 100 according to the eighth embodiment executes process other than the process executed in steps S701 through S703 in FIG. 10 in the same way as with the fourth embodiment, and accordingly, can obtain the same results as those in the fourth embodiment.

Note that the eighth embodiment may be implemented in combination with at least one of the sixth and seventh embodiments. In this case, the video camera 100 according to the eighth embodiment can obtain the same results as those in at least one of the sixth and seventh embodiments.

The communication apparatus according to the present invention is not restricted to the communication apparatuses described in the first through eighth embodiments. For example, the communication apparatus according to the present invention may be realized with a system configured of multiple apparatuses.

Also, the various types of process and functions described in the first through eighth embodiments may be realized with a computer program. In this case, the computer program according to the present invention is executed at a computer (including a CPU), thereby realizing the various types of functions described in the first through eighth embodiments.

It goes without saying that the various types of process and functions described in the first through eighth embodiments may be realized with the computer program according to the present invention by using the OS (Operating System) or the computer.

The computer program according to the present invention is read out from a computer readable storage (recording) medium, and is executed at the computer. As the computer readable storage medium, a hard disk apparatus, optical disc, CD-ROM, CD-R, memory card, ROM may be used. Also, the computer program according to the present invention is provided to the computer from an external apparatus via a communication interface, and is executed by the computer.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-175917 filed Jul. 4, 2008, which is hereby incorporated by reference herein in its entirety.

What is claimed is:

1. A communication apparatus comprising:
a transmitting unit that transmits video data to an external apparatus;
a receiving unit that receives a command from the external apparatus; and
a control unit that (a) performs a process for restricting a supply of power for the transmitting unit without restricting a supply of power for the receiving unit if a first command for reducing a power consumption of the communication apparatus is received from the external apparatus by the receiving unit, (b) determines whether a second command, which is different from the first command, is received by the receiving unit until a predetermined time elapses since the first command is received, and (c) performs a process for supplying power to the transmitting unit if the second command is received by the receiving unit until the predetermined time elapses since the first command is received.

2. The communication apparatus according to claim 1, further comprising:

a detecting unit that detects whether a connection between the communication apparatus and the external apparatus is disconnected, wherein the control unit performs a process for restricting a supply of power for the receiving unit if the connection between the communication apparatus and the external apparatus is disconnected until the predetermined time elapses since the first command is received.

3. The communication apparatus according to claim 1, wherein the control unit performs a process for restricting a supply of power for the receiving unit before the predetermined elapses if the first command is again received by the receiving unit until the predetermined period elapses since the first command is received.

4. The communication apparatus according to claim 1, further comprising:

an operating unit that operates the communication apparatus to restrict a power supply of the communication apparatus, wherein the control unit performs a process for restricting a supply of power for the receiving unit before the predetermined time elapses if the operating unit is operated until the predetermined time elapses since the first command is received.

5. The communication apparatus according to claim 1, wherein the control unit cancels the first command if the second command is received by the receiving unit until the predetermined time elapses since the first command is received.

6. The communication apparatus according to claim 1, further comprising a connection unit that is connectable to the external apparatus via a cable, wherein the transmitting unit transmits video data to the external apparatus via the cable, and wherein the receiving unit receives a command from the external apparatus via the cable.

7. The communication apparatus according to claim 6, wherein the cable conforms to the HDMI (High-Definition Multimedia Interface) standard.

8. The communication apparatus according to claim 1, wherein the control unit performs a process for restricting a supply of power for the receiving unit after the predetermined time elapses if the first command is received from the external apparatus by the receiving unit.

9. The communication apparatus according to claim 1, wherein the control unit performs a process relating to the second command after a process for supplying power to the transmitting unit is performed if the second command is received by the receiving unit until the predetermined time elapses since the first command is received.

10. The communication apparatus according to claim 1, wherein the receiving unit receives the first command based on a predetermined protocol, and the receiving unit receives the second command based on the predetermined protocol.

11. A method of controlling a communication apparatus, wherein the communication apparatus includes a transmitting unit that transmits video data to an external apparatus, and a receiving unit that receives a command from the external apparatus, the method comprising:

performing a first process for restricting a supply of power for the transmitting unit without restricting a supply of power for the receiving unit if a first command for reducing a power consumption of the communication apparatus is received from the external apparatus by the receiving unit;

determining whether a second command, which is different from the first command, is received by the receiving unit until predetermined time elapses since the first command is received; and performing a process for supplying power to the transmitting unit if the second command is received until the predetermined time elapses since the first command is received.

12. The method according to claim 11, further comprising:

detecting whether or not a connection between the communication apparatus and the external apparatus is disconnected; and performing a process for restricting a supply of power for the receiving unit before the predetermined time elapses if the connection between the communication apparatus and the external apparatus is disconnected until the predetermined time elapses since the first command is received.

13. The method according to claim 11, further comprising performing a process for restricting a supply of power for the receiving unit before the predetermined time elapses if the first command is again received by the receiving unit the predetermined time elapses since the first command is received.

14. The method according to claim 11, further comprising:

performing a process for restricting a supply of power for the receiving unit before the predetermined time elapses if an operating unit is operated until the predetermined time elapses since the first command is received.

15. The method according to claim 11, further comprising:

cancelling the first command if the second command is received by the receiving unit until the predetermined time elapses since the first command is received.

16. The method according to claim 11, wherein the transmitting unit transmits video data to the external apparatus via a cable, and wherein the receiving unit receives a command from the external apparatus via the cable.

17. The method according to claim 16, wherein the cable conforms to the HDMI (High-Definition Multimedia Interface) standard.

18. The method according to claim 11, further comprising:

performing a process for restricting a supply of power for the receiving unit after the predetermined time elapses if the first command is received from the external apparatus by the receiving unit.

19. The method according to claim 11, further comprising:

performing a process relating to the second command after a process for supplying power to the transmitting unit is performed if the second command is received by the receiving unit until the predetermined time elapses since the first command is received.

20. The method according to claim 11, wherein the receiving unit receives the first command based on a predetermined protocol, and wherein the receiving unit receives the second command based on the predetermined protocol.

* * * * *